June 1, 1926.
A. M. STANLEY ET AL
1,586,585
WELDING MACHINE
Original Filed Nov. 25, 1921   14 Sheets-Sheet 2
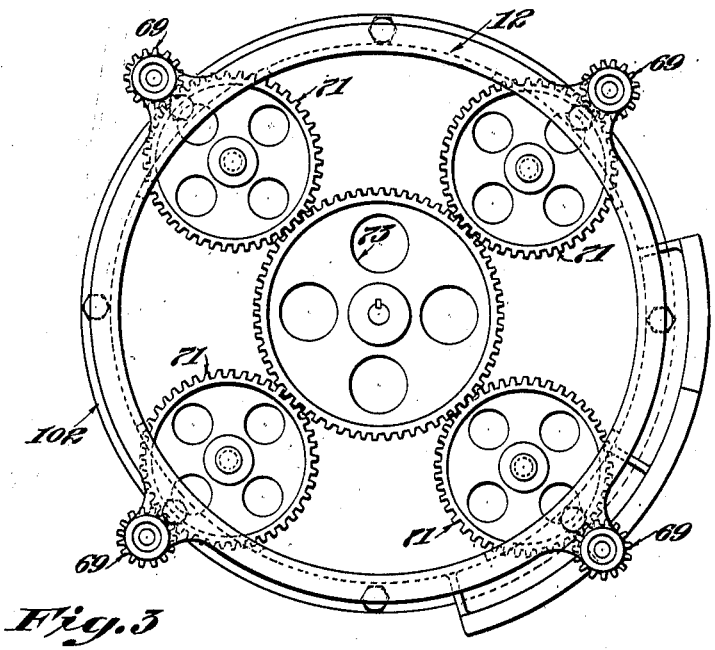
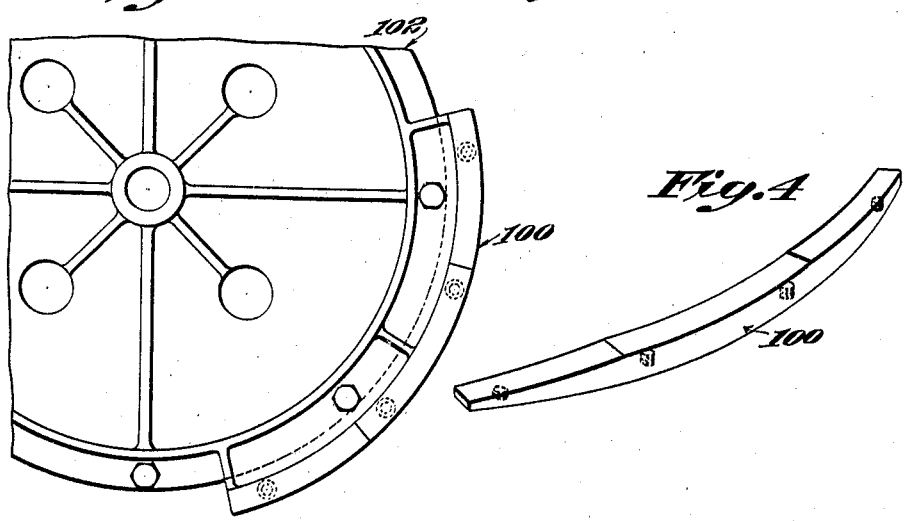

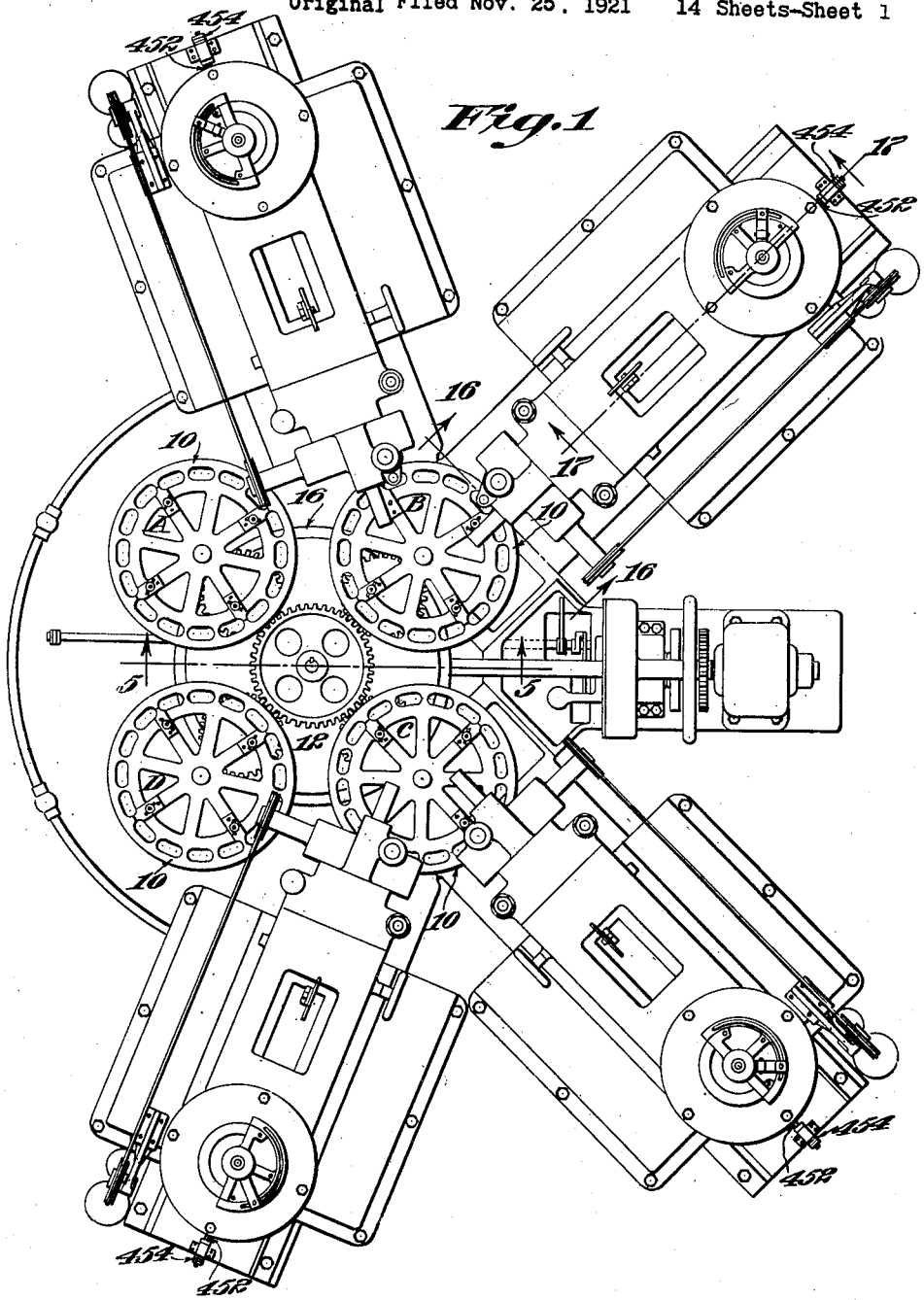

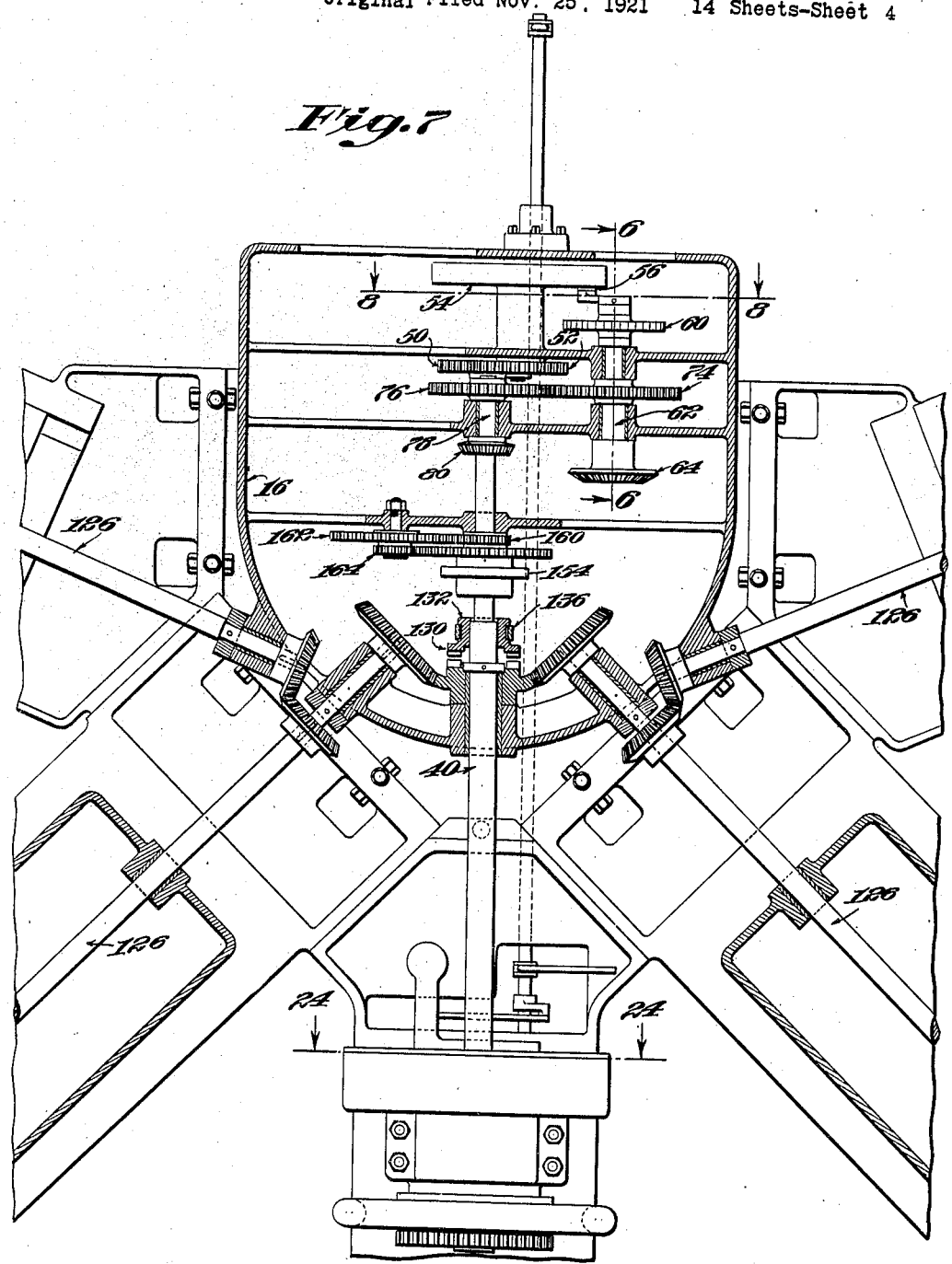

June 1, 1926.  
A. M. STANLEY ET AL  
WELDING MACHINE  
Original Filed Nov. 25, 1921 14 Sheets-Sheet 5
1,586,585
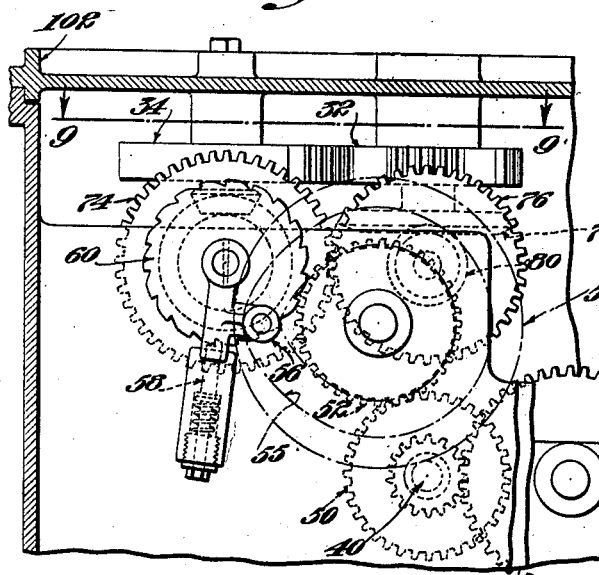
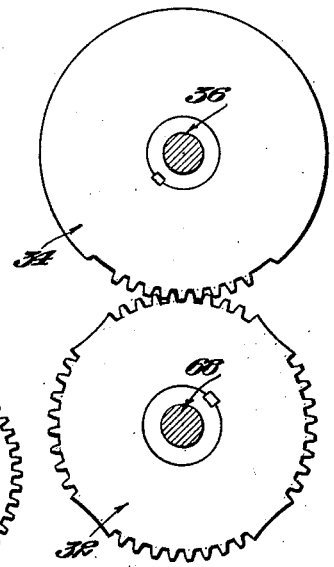
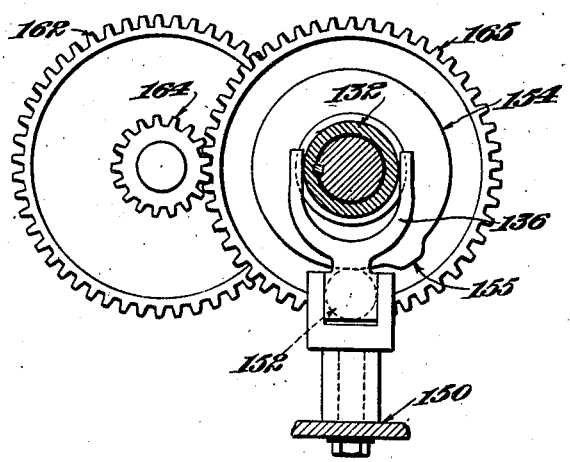
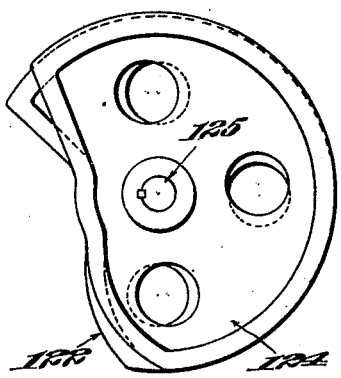

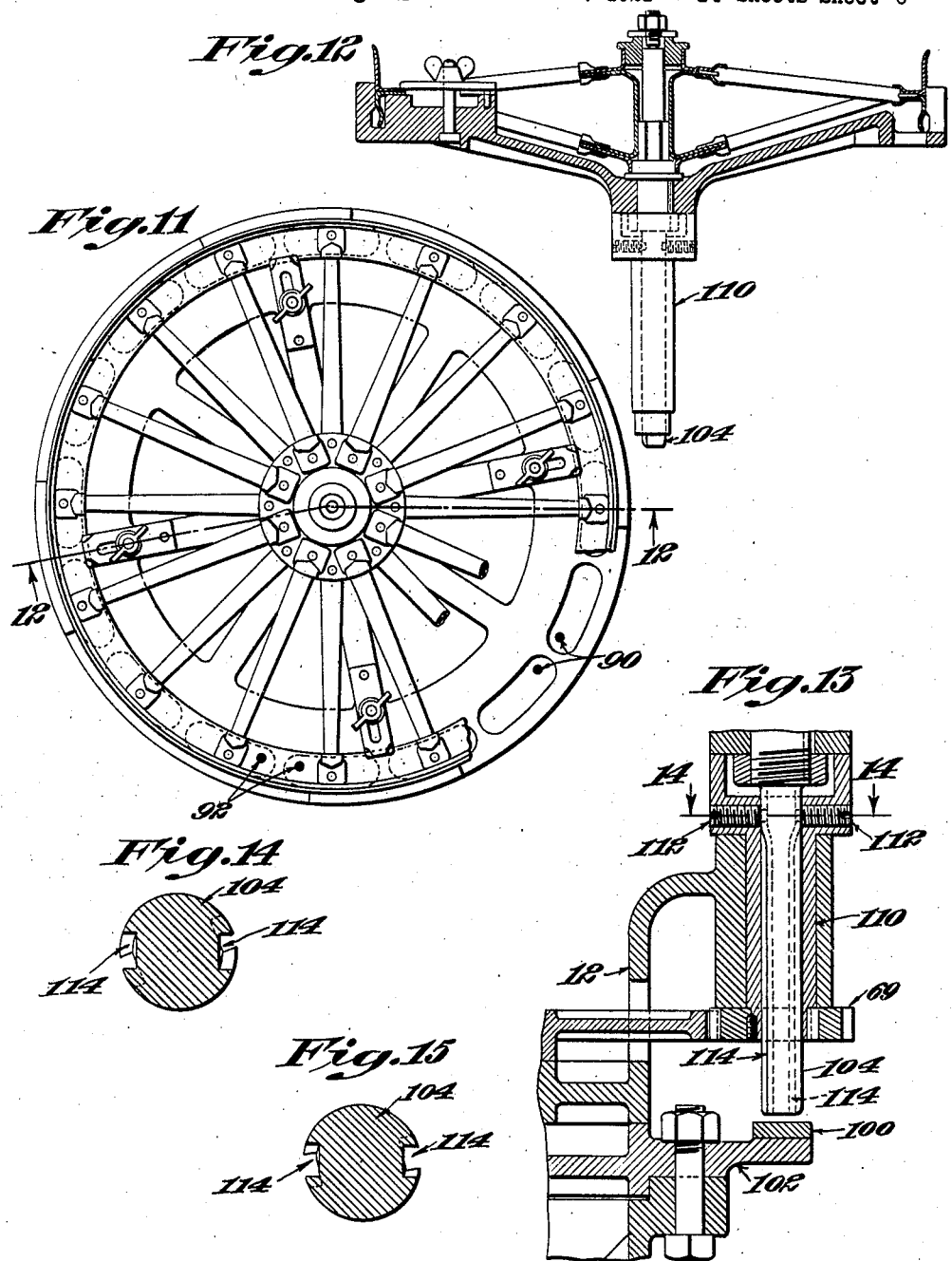

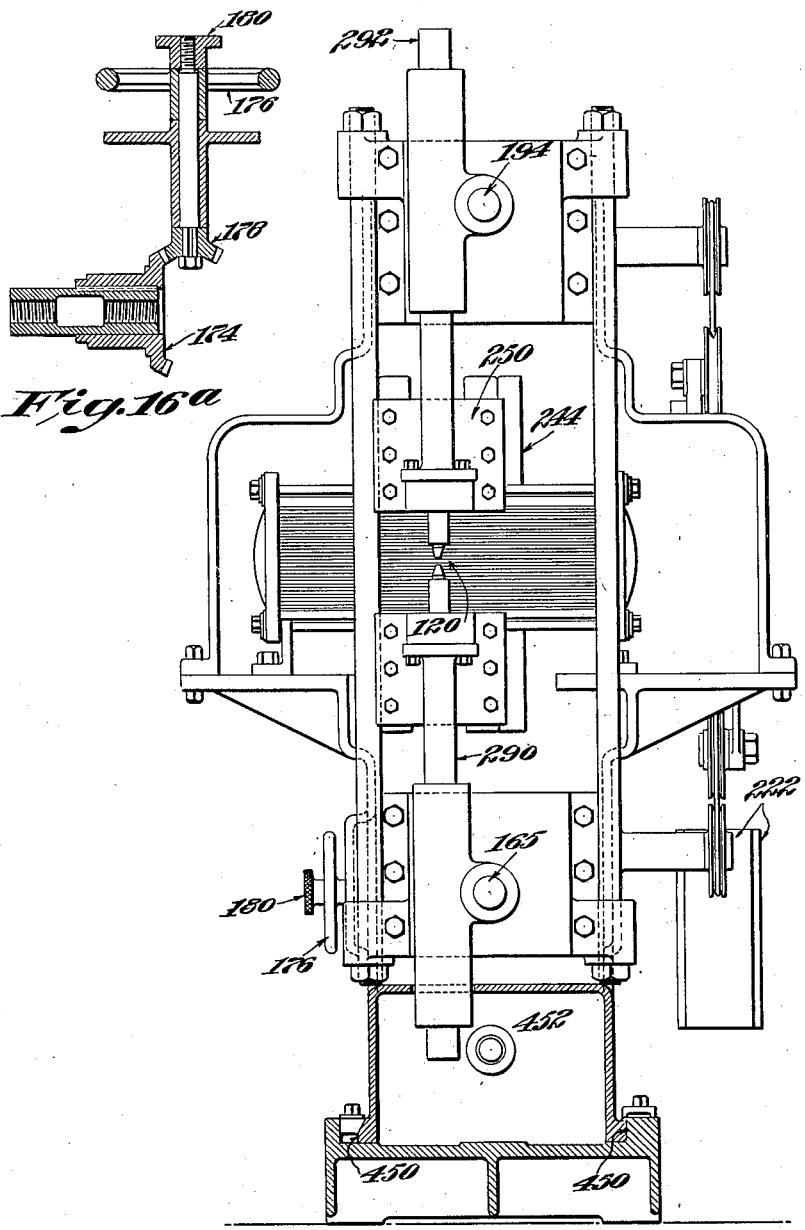

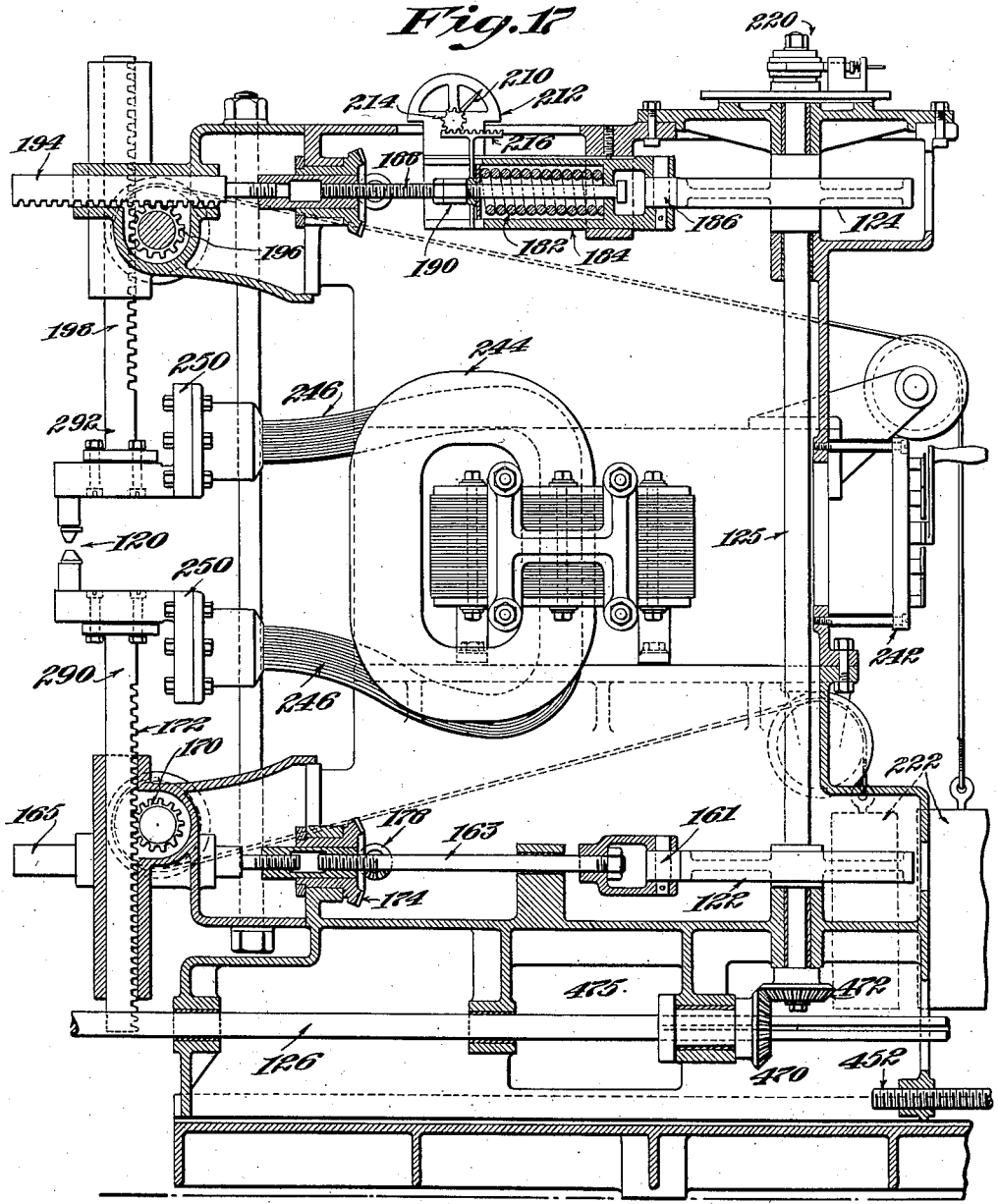

June 1, 1926.
A. M. STANLEY ET AL
WELDING MACHINE
Original Filed Nov. 25, 1921    14 Sheets-Sheet 9
1,586,585
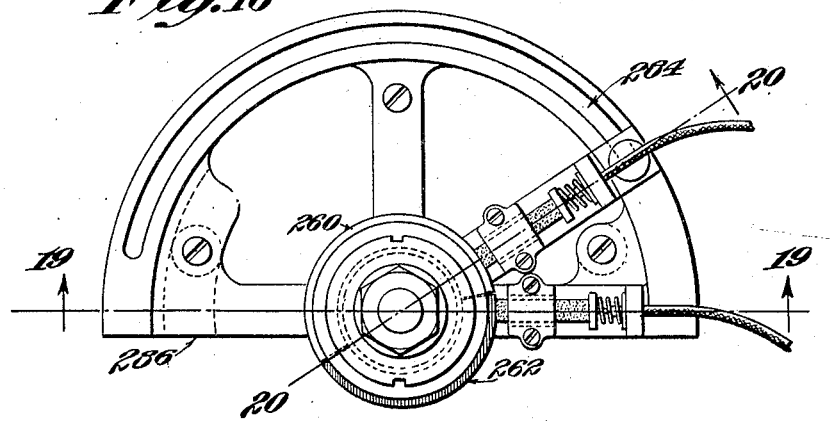
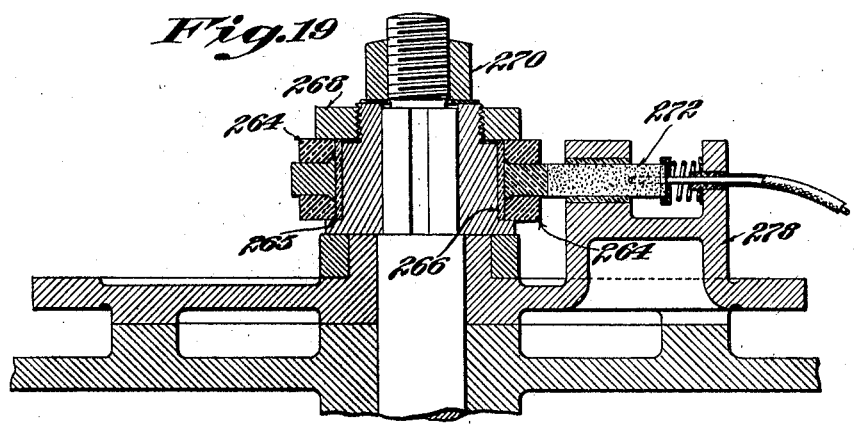
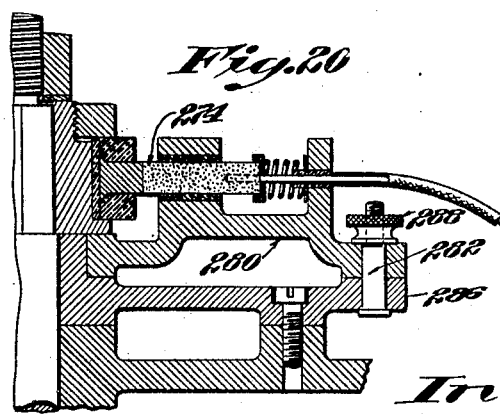

June 1, 1926.
A. M. STANLEY ET AL
1,586,585
WELDING MACHINE
Original Filed Nov. 25, 1921 14 Sheets-Sheet 10
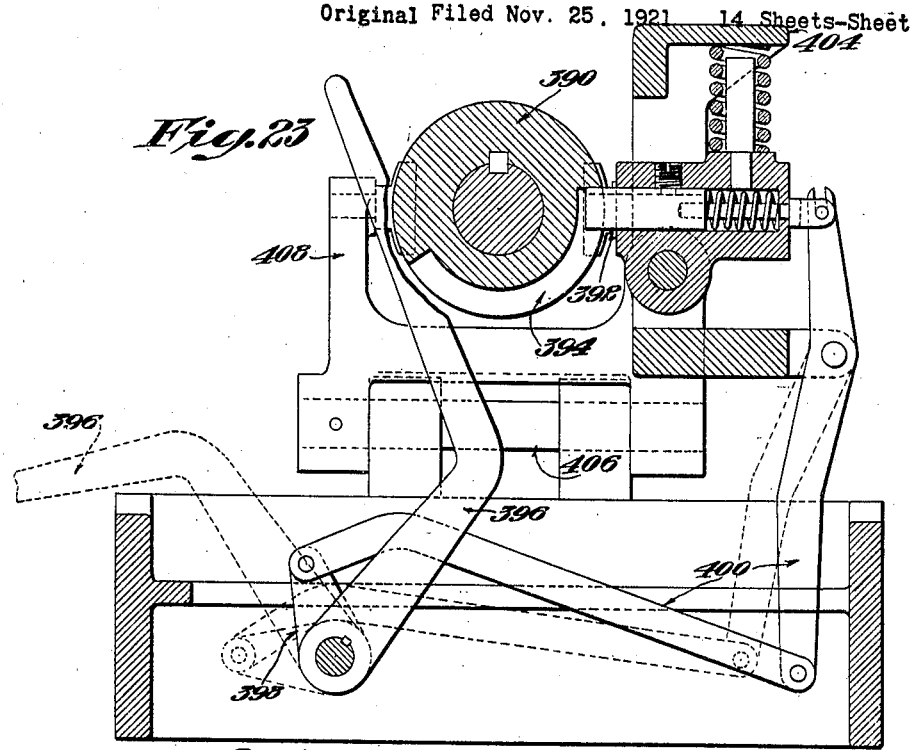
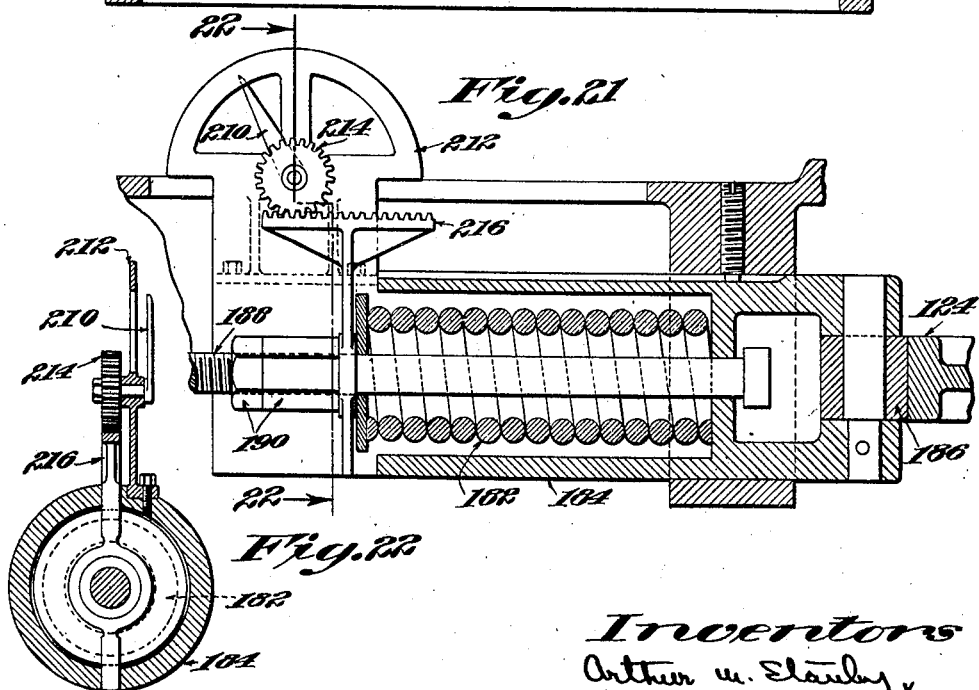

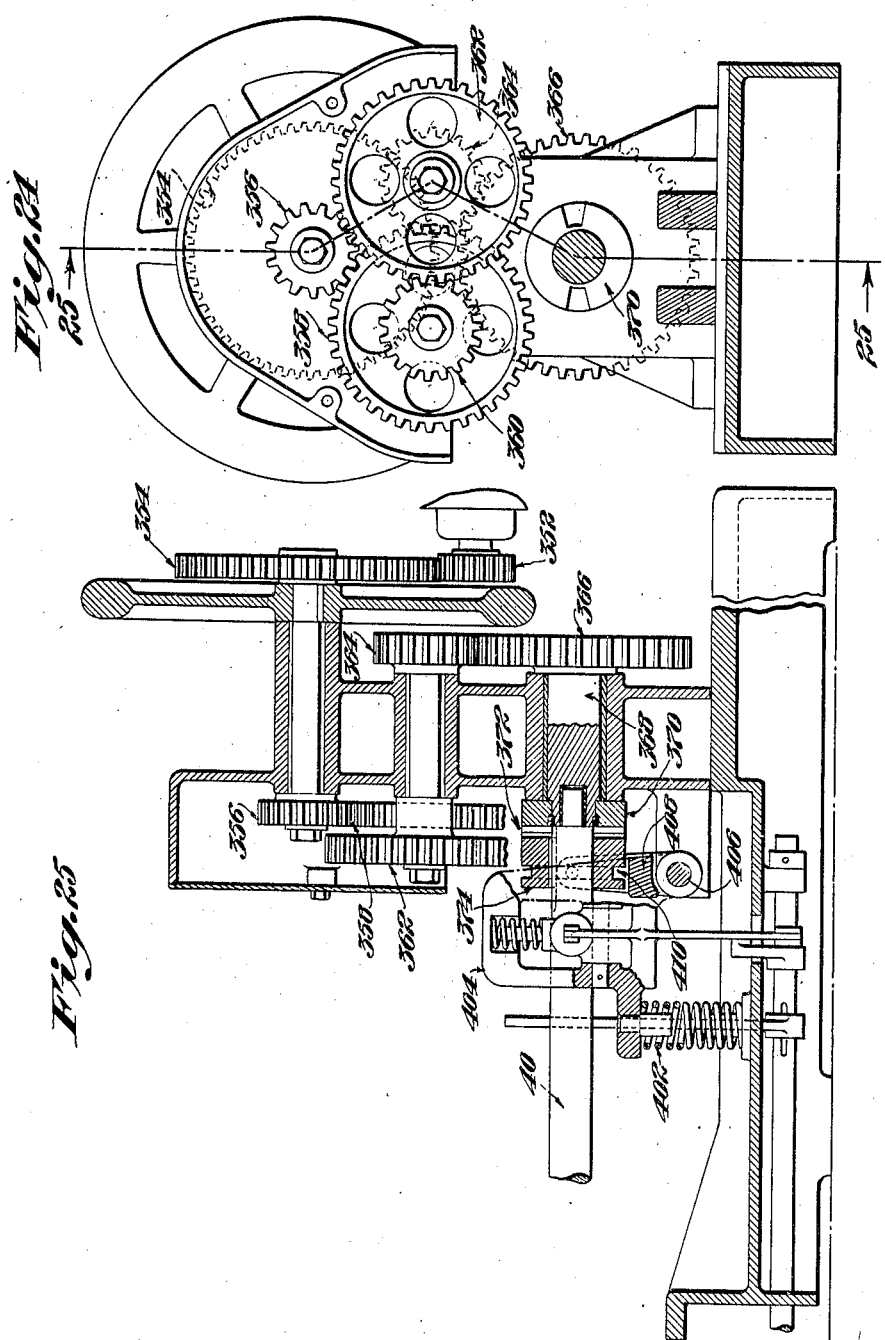

June 1, 1926. 1,586,585
A. M. STANLEY ET AL
WELDING MACHINE
Original Filed Nov. 25, 1921 14 Sheets-Sheet 12
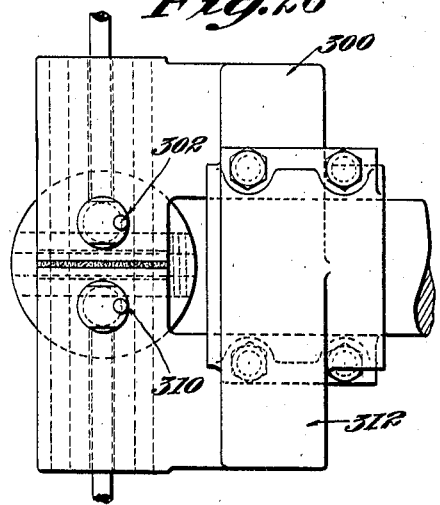
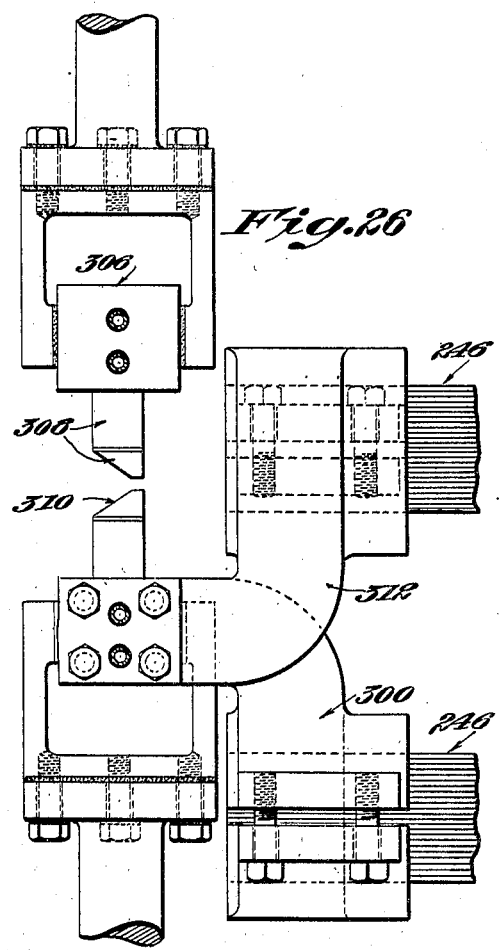
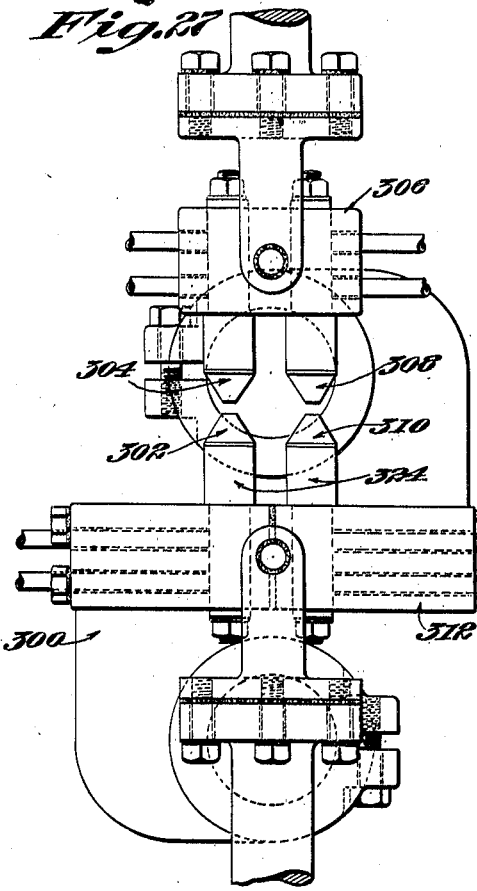
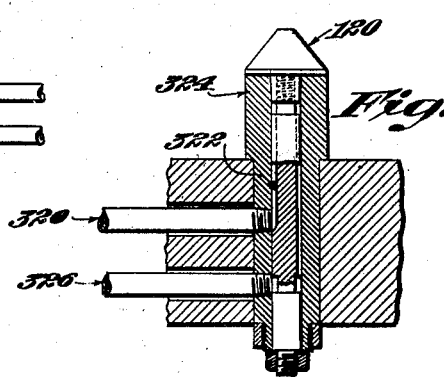

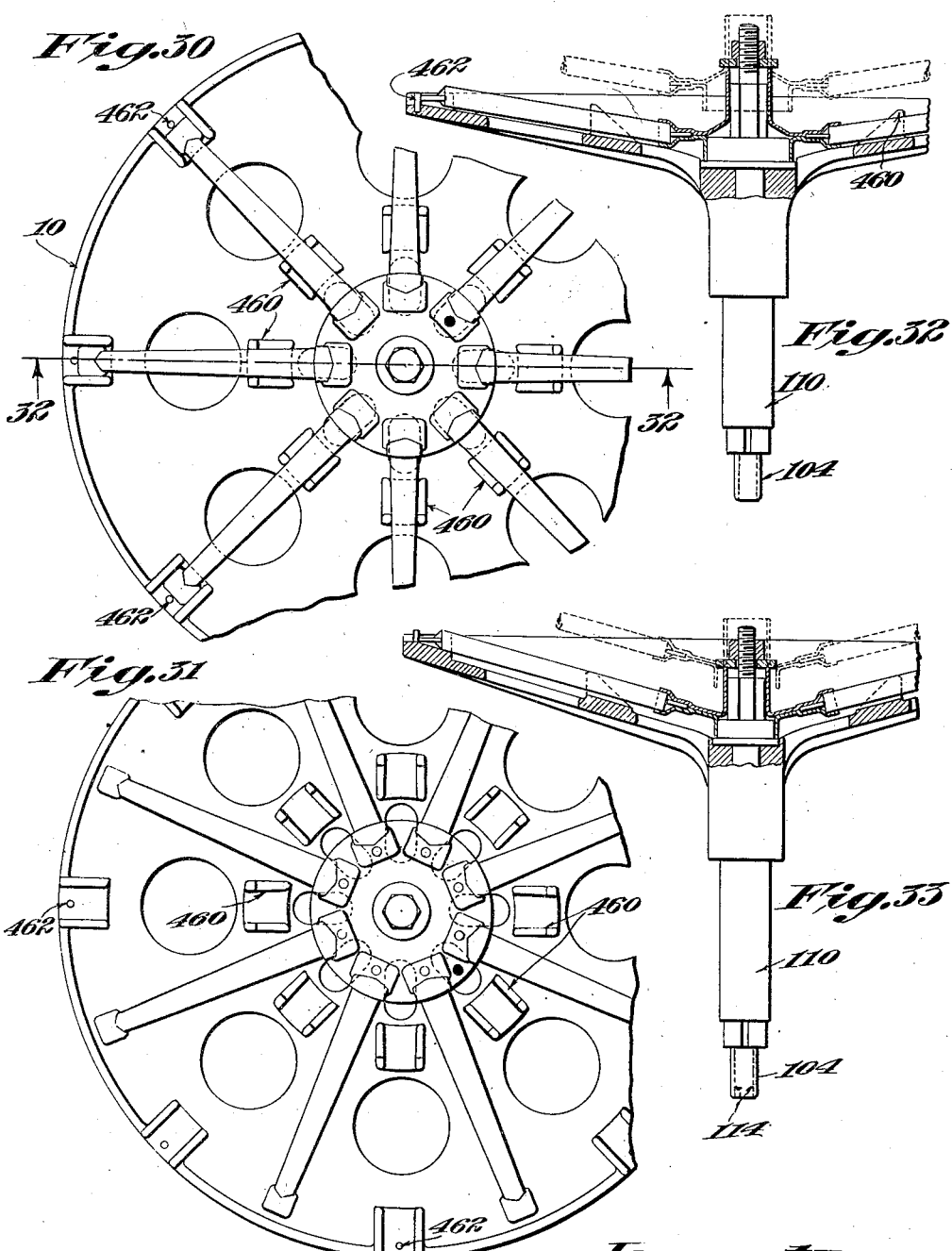

June 1, 1926.

A. M. STANLEY ET AL 1,586,585

WELDING MACHINE

Original Filed Nov. 25, 1921   14 Sheets-Sheet 14

Patented June 1, 1926.

1,586,585

UNITED STATES PATENT OFFICE.

ARTHUR M. STANLEY, OF LYNN, AND JAMES E. SIMS, OF QUINCY, MASSACHUSETTS, ASSIGNORS TO STANLEY STEEL WELDED WHEEL CORPORATION, OF BOSTON, MASSACHUSETTS, A CORPORATION OF DELAWARE.

WELDING MACHINE.

Application filed November 25, 1921, Serial No. 517,461. Renewed October 16, 1925.

This invention relates to a welding machine, and more particularly to a machine for welding steel vehicle wheels.

The primary object of the invention is to provide a welding machine of novel construction and operation, by which a series of welded areas may be advantageously and economically produced in different portions of the article to be welded, such as a steel vehicle wheel, to thereby securely unite adjacent parts thereof.

With this general object in view, one feature of the invention resides in the provision of means for automatically positioning the article to be welded with relation to welding electrodes to produce a series of welded areas in different portions of the article.

Another feature of the invention resides in the provision of means for automatically operating the electrodes, both mechanically and electrically, in timed relation to the movements of the article to be welded.

Other features of the invention reside in features of construction and operation, and in combinations and arrangements as will be hereinafter fully described and claimed.

The drawings illustrate features of the invention as embodied primarily in a machine for producing a series of welded areas in the rim portion of a steel vehicle wheel of the type disclosed in the Stanley Patent No. 1,168,228 of Jan. 11, 1916, and also illustrates such modifications of this machine as are requisite to enable it to produce a series of welded areas in the hub portion of the wheel.

Figure 5:
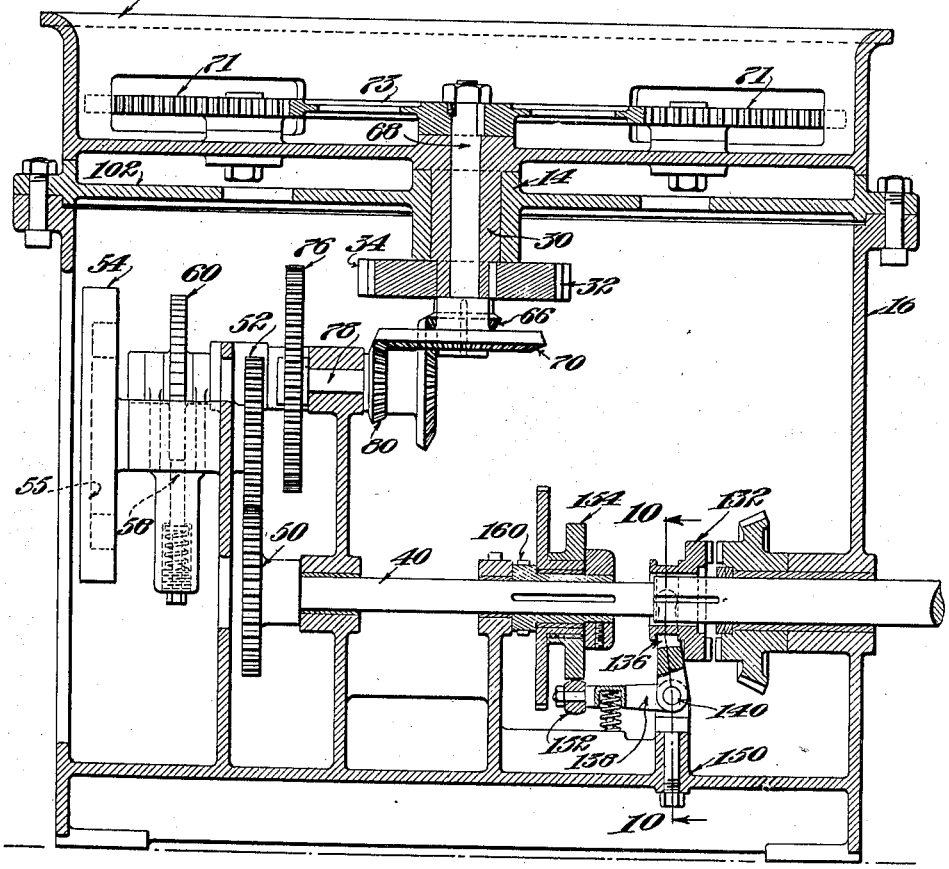
Figure 6:
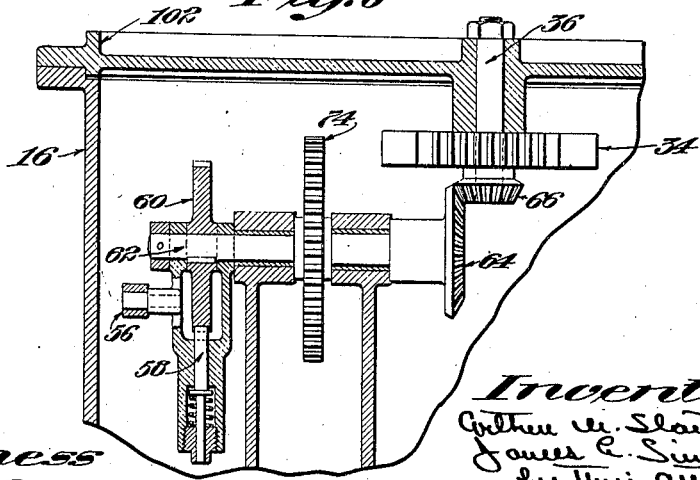
Figure 34:
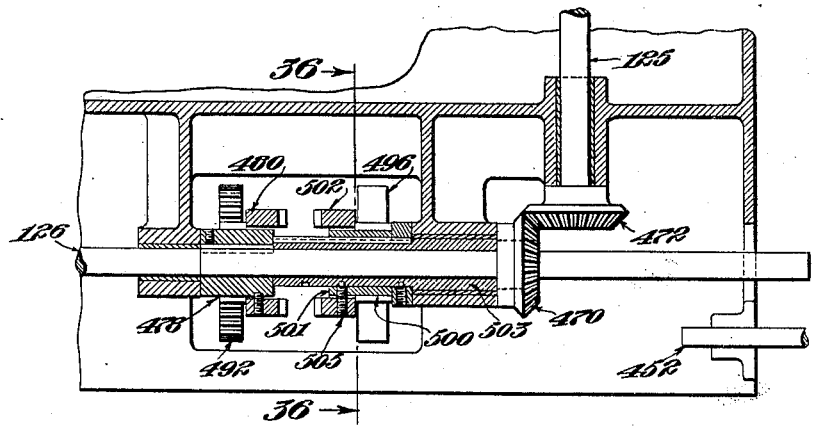
Figure 35:
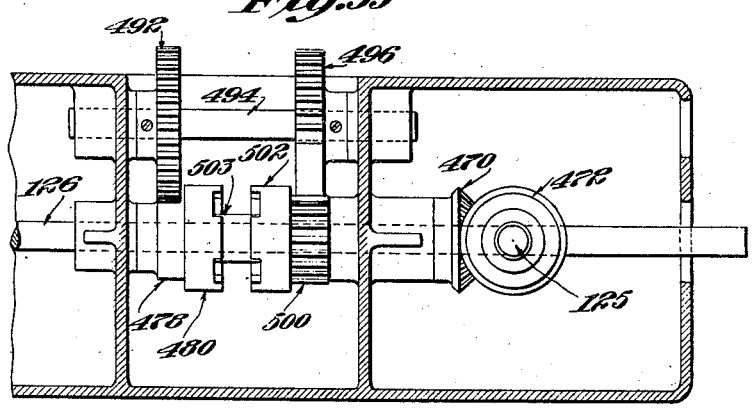
Figure 36:
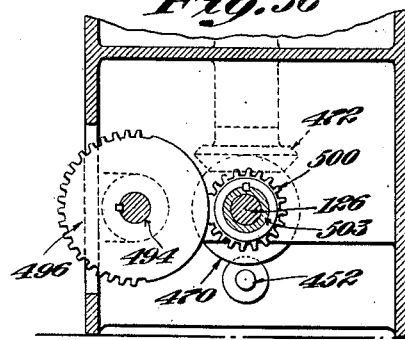

In the drawings illustrating the preferred embodiment of the invention, Fig. 1 is a plan view of the complete machine; Fig. 2 a plan view of turret and gearing; Fig. 3 is a plan view of body and jig raising cam; Fig. 4 is a perspective detail of jig raising cam; Fig. 5 is a vertical section through turret body taken on the line 5—5 of Fig. 1; Fig. 6 is a sectional detail taken on the line 6—6 of Fig. 7; Fig. 7 is a horizontal section of turret body showing plan of drive; Fig. 8 is an end elevation of driving mechanism taken on the line 8—8 of Fig. 7; Fig. 9 is a plan view of Geneva driving members on the line 9—9 of Fig. 8; Fig. 10 is a sectional detail of clutch mechanism on the line 10—10 of Fig. 5; Fig. 10ª is a plan view of electrode controlling cams; Fig. 11 is a plan view of wheel and jig for welding at rim; Fig. 12 is a section through same taken on the line 12—12 of Fig. 11; Fig. 13 is a detail section of jig spindle, gears and jig raising cam; Fig. 14 is a cross section of jig spindle taken on the line 14—14 of Fig. 13, showing 1/16 turn in grooves for hub welding; Fig. 15 is a similar section showing 1/32 turn in grooves for rim welding; Fig. 16 is an end elevation of electrode unit on the line 16—16 of Fig. 1; Fig. 16ª is a sectional detail of mechanism for manually adjusting distance between electrodes; Fig. 17 is a vertical longitudinal section of electrode unit on the line 17—17 of Fig. 1; Fig. 18 is a plan view of current timer; Fig. 19 is a section of the same taken on the line 19—19 of Fig. 18; Fig. 20 is a section of the same taken on the line 20—20 of Fig. 18; Fig. 21 is a vertical longitudinal section of pressure indicating mechanism; Fig. 22 is a cross section of the same taken on the line 22—22 of Fig. 21; Fig. 23 is a sectional end elevation of the main clutch mechanism; Fig. 24 is a sectional elevation of the main drive reduction gearing on line 24—24 of Fig. 7; Fig. 25 is a section through the same (line 25—25 of Fig. 24;) Fig. 26 is a side elevation of double electrode arrangement; Fig. 27 is an end elevation of the same; Fig. 28 is a plan view of lower electrodes; Fig. 29 is a detail section, this electrode showing water cooling ducts and connections; Fig. 30 is a plan view of jig for welding inside hub half, in position for welding at spokes; Fig. 31 is a plan view of the same in position for welding between the spokes; Fig. 32 is a section through jig on the line 32—32 of Fig. 30, raised position of jig in dotted lines; Fig. 33 is a similar section through jig for welding outside hub half; Fig. 34 is a vertical sectional detail of a supplementary mechanism for use when welding rear wheels with a certain kind of brake drum; Fig. 35 is a plan view of the same; Fig. 36 is a cross section of same showing Geneva drive members.

The machine illustrated in the drawings for producing welded areas in the rim portions of a vehicle wheel comprises in general four wheel holding jigs mounted upon a turret to revolve bodily therewith in order to be successively moved into four positions A, B, C and D 90 degrees apart. The positions A and D comprise assembling and unloading positions respectively, and the positions B and C comprise welding positions, in position B the outer ends of the spokes being welded to the rim portion by a pair of welding electrodes; and in position C the sections of the rim intermediate the ends of the spokes are welded together by a second pair of electrodes. The wheel holding jigs are themselves intermittently rotated so that during the time when one of the jigs is in a welding position, successive portions of the wheel are presented to the welding electrodes. The welding electrodes are operated mechanically and electrically in timed relation to the movements of the wheel holding jigs so as to perform the welding operations at the proper times. The operation of the entire machine is automatic, the movements of the various mechanisms being derived from a main driven shaft through suitable gearing as will be described.

In operation the hub section of the wheel, including the hub and extended spokes, together with the rim sections are assembled in one of the jigs in position A (see Fig. 1) and thereafter the jig and wheel are moved automatically through positions B and C, remaining in each for a sufficient length of time to permit the desired welding operations to be performed. The welded wheel is unloaded from the jig in position D. Referring to the drawings the machine for welding the rim portions of the wheel is described in detail as follows: Each of the four wheel holding jigs 10 is mounted upon a turret 12 journaled to rotate in a central bearing 14 in the frame 16 of the machine. The hub and rim sections of a wheel are assembled in one of the wheel holding jigs in position A of Fig. 1, and thereafter the jig and wheel is moved upon revolution of the turret successively into the welding positions B and C where the welding operations are performed, and then into position D where the welded wheel is unloaded from the jig. In order to advance the turret 12 to move successive jigs from one of the positions A, B, C and D to the next succeeding, and to permit each jig to remain in each position for the respective operations to be performed upon the wheel, provision is made for intermittently revolving the turret through successive angles of 90 degrees. For this purpose the turret 12 is provided with a depending sleeve 30 to which a Geneva gear 32 is keyed, as shown in Figs. 5 and 9. The Geneva gear 32 is rotated through successive quarter turns by a second or driving Geneva gear 34 mounted upon the end of a second vertical shaft 36 journaled in the machine frame (see Figs. 6 and 8) and itself actuated from the main driven shaft 40 of the machine through driving mechanism illustrated in detail in Figs. 5, 6, 7 and 8. Referring particularly to Figs. 5 and 8, the revolutions of the main driven shaft 40 of the machine are transmitted to the driving Geneva gear 34 by a spur gear 50 upon the end of the driving shaft, a second spur gear 52 meshing therewith, a cam 54 and cam groove 55, a cam roll 56, an oscillatory pawl 58, and an eighteen-tooth ratchet 60. The design of the gears 50, 52 and cam 54 is such that one revolution of the main driving shaft 40 causes the ratchet wheel 60 to be advanced one tooth, or one-eighteenth of a revolution. The ratchet 60 is mounted upon a counter shaft 62, having on its end a bevel gear 64 meshing with a second bevel gear 66 (see Fig. 6) fast on the driving Geneva gear 34. The ratio of the bevel gears 64 and 66 is 2:1. From the description thus far it will be observed that one revolution of the main driving shaft 40, producing as above described an eighteenth of a revolution of the ratchet 60, operates through the bevel gears 64 and 66 to produce a ninth of a revolution of the driving Geneva gear 34. In other words at every nine revolutions of the main driving shaft 40 the driving Geneva gear 34 will be moved through a complete revolution, and the driven Geneva gear 32 and turret 12 keyed thereto, through a fourth of a revolution, so that at every nine revolutions of the main driving shaft the wheel jigs are bodily moved with the turret through arcs of 90 degrees from one of the positions A, B, C and D to the next succeeding.

The wheel upon which the machine illustrated in the drawings is adapted to perform the welding operations, has eight spokes radiating from each side of the hub section, making sixteen spokes in all. These sixteen spokes are welded to the rim sections during the interval between movements of the turret from position B to position C; and the rim points intermediate the ends of the spokes are welded during the interval between movement of the turret from position C to D. Inasmuch as two pairs of welding electrodes having single contact points are employed in position B, in which the welding of the spokes to the rim sections is accomplished, it is apparent that while in position B, the wheel holding jigs 10 must be rotated intermittently through eight successive steps in order that eight pairs of welded areas may be produced by the cooperating pairs of electrodes, producing sixteen welds in all. In position C in which the rim sections between the ends of adjacent spokes are welded at two points, making thirty-two welds around the periphery of the wheel, two pairs of electrodes having double contacts are employed, so that between successive of the eight intermittent advances of the wheel holding jig while in position C, four welded areas are produced.

The intermittent quarter turns of the turret 12, to move a wheel holding jig from one position to another, and the intermittent rotation of the wheel holding jigs are timed with relation to one another, so that the jigs may make a complete rotation during the period that the turret is stationary between each quarter turn. The movements of both the turret and jigs are, as previously described, derived from the cam 54. The design of the Geneva gears (see Fig. 9) 50, 52 is such that the turret remains stationary between each quarter turn for 7 5/6 revolutions of the cam, and during the remaining 1 1/6 revolutions of the cam, the turret is moved a quarter turn to the next position.

The wheel holding jigs 10 are intermittently but continuously rotated upon the individual axes through successive steps of 1/8 of a rotation. The rotations of the jigs are timed with relation to the cam 54 so that during the 7 5/6 revolutions of the cam while the turret is stationary in each of the positions A, B, C and D, each jig completes a rotation. For this purpose each mandrel of the wheel jigs is provided on its lower end with a pinion 69 meshing with an intermediate gear 71 in turn driven by a central driving gear 73. The vertical shaft 68 (Fig. 5) upon which the central driving gear is keyed is provided on its lower end with a bevel gear 70. The rotations of the driving cam 54 are transmitted to this bevel gear 70 through a gear train comprising a spur gear 74 fast upon the counter shaft upon which the ratchet 60 is mounted, a second spur gear 76 meshing therewith upon a short counter shaft 78 having upon its other end a bevel gear 80 arranged to mesh with the bevel gear 70. The design and ratios of this gear train is such that one revolution of the drive cam 54 moves the wheel jig 10 through 1/8 of a rotation. The cam groove 55 in the drive cam 54 is of such design that during the first 5/6 of its revolution the ratchet wheel 60 is not moved by the oscillatory pawl 58 and during the last 1/6 of each revolution of the drive cam 54, the ratchet wheel 60 is moved through 1/18 of a revolution and operates through the gear train to cause the advance of the wheel holding jig 10 through 1/8 of a rotation. During the time that the ratchet wheel 60 and therefore the wheel holding jig 10 is standing idle, namely during the first 5/6 of each revolution of the drive cam, provision is made as will be hereinafter described for automatically moving the welding electrode points into contact with the under and top sides respectively of the portion of the rim between which the flattened end of the spoke is positioned, and further for electrically energizing the electrode points to produce the desired spot weld through the rim portions and the spoke, thus securely uniting the same together. This welding operation therefore takes place during the first 5/6 of each of the first 8 revolutions of the cam after the turret 12 has turned to the position B. The welding electrodes are arranged, as will be described, to be moved apart at the end of the period during which the drive cam 54 is making the first 5/6 of each revolution, so that the eighth welding operation will be completed and the electrodes moved apart after the drive cam 54 has moved through seven and 5/6 revolutions. During the last 1/6 of the eighth revolution of the drive cam therefore, the ratchet wheel 60 is moved by the oscillating pawl and operates through the Geneva gear 34 which has, as previously described, remained idle during the first 7 5/6 revolutions of the drive cam, to turn the turret 12 bodily through its next quarter turn and to move the wheel holding jig and wheel to the position C. This movement of the turret is completed during the ninth revolution of the driving cam.

In position C the welding operation is to be performed at points upon the rim section between the ends of adjacent spokes. Referring to Fig. 11, the points 90 and 92 indicate the relative position of the welded areas produced by the pair of double electrodes employed to perform the welding operation. It is desirable that between adjacent spokes two points should be welded. Inasmuch as there are sixteen spaces between adjacent spokes and that it is desirable to weld the rim section at two points between each space, it is obvious that thirty-two welds must be made. In order that these thirty-two welds may be made during eight successive advances of the wheel jig, it is necessary that two pairs of double electrodes be employed to perform the welding operation, thus welding four areas at each step advance of the wheel jig.

Furthermore, in order to start the welding operation at the desired points between the ends of the spoke it is necessary that during the bodily rotation of the turret 12 from position B to position C, the wheel jig 10 should be rotated relatively to the turret, 1/16 of a rotation so that thereafter during the eight successive step advances of the wheel jig while in position C, the electrode points will come at the desired space upon the rim between the ends of the spoke. This is accomplished by means of a raising cam 100 secured to the upper cross member 102 of the body portion of the frame of the machine, as shown in Fig. 13, and in position to be engaged by the depending mandrel 104 of the wheel jig. The construction of wheel jig is illustrated in Figs. 11, 12, 13, 14 and 15, and comprises in general a dish-shaped wheel supporting member having a mandrel depending vertically therefrom. The outer end portions of the spokes are retained in operative position with relation to the portions of the rim by clamping devices 109. The pinion gear 69 is keyed to the lower portion of a sleeve 110 through which the mandrel extends, and set screws 112 are provided on opposite sides of the sleeve, the ends thereof being received within spiral grooves 114 in the depending portion of the mandrel 104. The set screws operate to prevent relative rotation of the sleeve 110 and mandrel 104 except when the mandrel is raised as the lower end thereof rides upwardly upon the cam surface 100 during the movement of the turret 12 from position B to position C. In this instance the vertical movement of the mandrel operates through the spiral grooves and screws cooperating therewith, to turn the sleeve 110 and consequently the body portion of the jig 10 through 1/16 of a rotation, thus accomplishing the desired relative movement between the jig and the turret.

After the wheel jig has arrived at position C it is intermittently advanced through successive steps of 1/8 of a revolution, through the operation of the gear train actuated by the main drive cam 54, as previously described in connection with the welding at position B. The welding operation is performed by the two pairs of electrodes having double electrode points, the latter being mechanically and electrically operated in the proper timed relation, as will be described, so that the desired welding is accomplished during the first seven and 5/6 revolutions of the driving cam 54, exactly as was the case in position B. Thereafter during the remaining portion of the eighth revolution of the drive cam 54 and during the ninth revolution thereof, the turret is bodily moved into position D through the operation of the Geneva gear train.

During the 7 5/6 revolutions of the driving cam 54 after the turret has been moved into position D, ample opportunity is afforded for the unloading of the finished wheel from its wheel holding jig.

As previously described the period during which the turret 12 is stationary after having been moved through a quarter turn is sufficient to enable the wheel holding jigs in both positions B and C to be intermittently rotated through eight successive steps. The period of rest between each successive step corresponds to the first 5/6 of the revolution of the driving cam 54. During this period of rest of the wheel holding jigs 10 in each of the positions B and C, provision is made for mechanically moving the electrode points, indicated by the general reference 120 (see Figs. 16 and 17), into contact with the upper and lower surfaces of the portion of the rim to be welded and for thereafter moving the electrode points apart after the welding has been performed. For this purpose the electrode points 120 are moved toward one another through the actuation of the controlling cams 122, 124 (see Fig. 17) which are continuously driven from the main driving shaft 40 of the machine through electrode driving shafts 126 (see Fig. 7) and an automatically operated clutch 130. The operation of the clutch is arranged so that the controlling cams 122, 124 are driven at all times except when the turret 12 is moving from one position to the next.

The automatically operated clutch comprises a movable member 132 adapted to be moved into and out of engagement with a driven member keyed to the main driving shaft 40 of the machine. The movable member of the clutch is actuated by a yoke 136 (see Figs. 5 and 10) formed upon one end of a bell crank 138 pivoted upon a stud 140 extending from a cross member 150 of the machine frame. The second end of the bell crank is provided with a cam roll 152 adapted to engage a cam 154. When the high point of the cam 155 passes in contact with the cam roll, the bell crank is oscillated to the left, viewing Fig. 5, to disengage the clutch. This occurs during the movement of the turret from one position to the next. In order that the clutch may remain in engagement to actuate the electrode controlling cams during the entire welding period of each position, namely while the wheel holding jigs are being rotated through eight successive steps, the roll 152 is actuated at a reduced rate through a gear train comprising a pinion 160 fast upon the driving shaft, a spur gear 162, a pinion 164, and a second spur gear 165 to which the clutch controlling cam 154 is secured. The design of this gear train is such as to reduce the revolutions of the driving shaft 40 in the ratio of 9:1. The angular duration of the high point of the cam with the cam roll (see Fig. 10) is such as to disengage the clutch just prior to the time when the turret 12 starts to move from one welding position to the other, and to hold it disengaged until the next position has been reached. From the description thus far it will be observed that after the turret 12 has moved a wheel holding jig into the positions B or C, the automatically operating clutch immediately starts the revolution of the electrode controlling cams so as to move the electrode points into contact with the wheel and that the movements of the electrode are timed with relation to the main driving shaft and consequently to the movements of the turret and wheel holding jigs so that the movements of the electrodes are completed while the turret is in a stationary position and durin Fig. 19. A second lock nut 270 is screwed onto the threaded end of the cam shaft and retains the segment and bushing in fixed relation to the cam shaft, so that the whole is rotated therewith. Two brushes 272, 274, preferably of carbon, are provided for cooperating with the segments. The brush 272 is stationary being mounted in a bracket 278 bolted to the upper end of the frame of the welding unit, as shown in Fig. 17. The second brush 274 is adjustable, being mounted in a movable bracket 280 which is arranged to swing a retaining bolt 282 traveling in a slot 284 in the periphery of the supporting segment 286, as shown in Figs. 18 and 20. A nut 288 threaded onto the upper end of the bolt 282 serves to clamp the movable brush in any desired position. It will therefore be observed that the time at which the current is cut off from the electrode points in relation to their operating cams 122, 124 may be varied by movement of the adjustable brush 274. The time at which the current comes on, however, is always the same, being controlled by the stationary brush 272.

As previously described, in position B, two sets of cooperating single electrode points are employed to produce the desired sixteen welds at the ends of the sixteen spokes; whereas in position C two sets of cooperating double electrode points are used to give thirty-two welds at the rim between the ends of the spokes. In position B the current induced in the secondaries 246 of the transformer is conducted to one electrode holding bar 290 and flows through the metal of the wheel and back through the second electrode holding bar 292 and secondary connected thereto, as shown in Fig. 17. In position C, however, in which double electrodes are used the two secondaries are connected to the bottom electrode holders. As shown in Figs. 26, 27 and 28, one secondary is connected to the bottom electrode holder 300 and current flows therefrom to the electrode point 302, through the material, to the upper electrode point 304, thence through the upper electrode holder 306 and downwardly through the second pair of electrode points 308 and 310 to the second bottom electrode holder 312. The two holders 300, 312, for the bottom electrode points are insulated from one another by the fibre plate 316. The electrode holders in all of the welding units are water cooled, as shown in detail in Fig. 29. The cooling water entering one inlet pipe 320 passes into an interior chamber 322 within the metal sleeve 324 to which the electrode point itself is secured and flows outwardly through the exit pipe 326.

The main driving shaft 40, from which the turret, wheel jigs, and electrode operating mechanism are actuated, as has been described, is itself driven from an electric motor 350 or other source of power through a reducing gear train illustrated in Figs. 24 and 25. Referring to Figs. 24 and 25, the rotations of the driving pinion 352 upon the motor shaft, are transmitted to the main driving shaft 40 through a reducing gear train comprising a spur gear 354, pinion 356, spur gear 358, pinion 360, spur gear 362, pinion 364 and spur gear 366 fast upon the shaft 368 to which one member 370 of a clutch 372 is secured. The second or movable member 374 of the clutch 372 is keyed upon the main driving shaft 40 and slides thereon. The rotations of the motor are reduced by the gear train so that the main driving shaft 40 revolves at a reduced speed preferably in the neighborhood of 20 R. P. M.

It is desirable that the machine should be arranged to be automatically stopped when the electrode point 120 of each of the welding units are in their separated positions, and for this purpose a specially designed clutch actuating mechanism is employed, as shown in detail in Figs. 23 and 25. Referring to Fig. 23 a controlling cam 390 is keyed to the movable member 374 of the main clutch 372. A spring pressed plunger 392 is arranged to cooperate with a groove 394 in the controlling cam 390. When it is desired to start the machine, the operating lever 396 is thrown to the left, viewing Fig. 23, into the dotted line position, operating through the crank 398 and linkage 400 to mechanically withdraw the plunger 392 from cooperation with the cam. After the plunger has been thus withdrawn a heavy coil spring 402 (see Fig. 25) operates to oscillate the entire bracket 404 to the right viewing Fig. 25 about the pin 406 as an axis. The bracket 404 is provided with a yoke 408 which is received within a groove 410 in the movable member of the clutch. From an inspection of Fig. 25 it will be apparent that when the entire bracket 404 is moved to the right under the influence of the heavy coil spring 402 the yoke 408 forces the movable member 374 of the clutch into engagement with the driven member 370 and firmly clutches the driven member to the main shaft 40. In assembling the machine the cam 390 is timed with relation to the movements of the electrodes of each unit so that when the cam surface 412 (see Fig. 23) engages the plunger 392 and thereafter moves the entire bracket 404 to the left, viewing Fig. 25, about the pin 406 as a center so as to thereby release the clutch, the electrodes are in their separated positions. In order to stop the machine, therefore, the operating lever 396 is thrown upward into the full line position (see Fig. 23) thereby permitting the coil spring 393 to force the plunger 392 into engagement with the cam 390. The ing the period when the wheel holding jig is advanced through eight successive steps.

Immediately after the turret 12 has moved the wheel jig 10 into either of the positions B or C and the wheel jig itself has come to a stationary position corresponding to the first of its successive eight steps, the cams 122, 124 upon the cam shaft 125 driven by the electrode driving shaft 126 through bevel gears 127, 129, operate to move the electrode points 120 into contact with the lower and upper surfaces of the portion to be welded. The design of the lower cam 122 is such that after the lower electrode point has been moved into contact with the under surface of the wheel, no further movement of the electrode point takes place, the active surface of the cam being concentric with the center of the cam, as shown in detail in Fig. 10$^a$.

Referring particularly to Fig. 17, the movements of the cam 122 are transmitted to the lower electrode point through a cam roller 161, connector 163, horizontal rack 165, wide face pinion 167 meshing therewith, and through a vertical rack 170, meshing with the wide face pinion 167. The connector 163 comprises a turn buckle by which the initial position of the lower electrode point may be adjusted to accommodate the electrodes to varying thicknesses of the wheels to be welded. A beveled gear 174 is keyed to the turn buckle so as to permit movement of the turn buckle through the gear. A hand wheel 176 (see Fig. 16) is connected by a shaft to a beveled gear 178 meshing with the beveled gear 176 so that the turn buckle may be conveniently adjusted from the exterior of the machine. A jam nut 180 holds the hand wheel in any adjusted position.

The movements of the upper cam 124 are transmitted to the upper electrode through a coil spring 182 received within a sleeve 184 in which the cam roller 186 is journaled. The second end of the spring abuts a washer which is adjustably prevented from movement with relation to the turn buckle connector 188 by nuts 190. The turn buckle 188 is provided with a horizontal rack 194 meshing with a pinion 196 upon the shaft of which a second pinion is secured to engage the vertically arranged rack 198. It will therefore be observed that as the sleeve is moved to the left, viewing Fig. 17, under the impulse of the cam 124 the upper electrode point is moved downwardly through the force transmitted through the coil spring. When the upper electrode point comes in contact with the upper surface of the wheel to be welded at a point directly above the lower electrode point, the controlling cam 124 operates to gradually increase the pressure exerted upon the coil spring by the sleeve thus creating a heavy downward thrust on the electrode point. The amount of this pressure may be adjusted by the position of the nuts 198 to permit the length of the spring to be increased or decreased. Provision is made for indicating the amount of pressure exerted by the compressed spring and therefore the welding pressure exerted by the upper electrode point, and for this purpose a pointer 210 is arranged to cooperate with a graduated scale 212, as shown in Figs. 17 and 21. The pointer 210 is actuated through frictional engagement of a pinion 214 actuated by a rack 216, itself moved by the movements of the spring as it increases or decreases in length under varying pressures. The graduated scale is calibrated to indicate in units of pressure the relative compression or elongation of the spring.

In operation current is supplied to the electrode points 120 immediately after they have come in contact with the upper and lower wheel surfaces. The current is permitted to flow for a sufficient length of time to heat the material between the electrode points to the welding temperature, the flow of the current being controlled by a timer 220 mounted upon the upper end of the cam shaft and of the construction, as will be described, illustrated in detail in Figs. 18, 19 and 20. Thereafter the upper electrode point under the actuation of its controlling cam 124 exerts an increased pressure upon the heated material, thereby compressing the same and finishing the weld. After the welding has been completed the electrode points are moved apart through the operation of counter weights 222 connected to pulleys upon the shafts of the pinions, as shown in Fig. 17, the controlling cams permitting operation of the counter weights at the desired time.

The current for the electrode points 120 is supplied from a source of supply, not shown, to the commutator or timer 220 mounted upon the upper end of the cam shaft 125 (see Fig. 17). From the commutator the current is conducted through a rheostat, illustrated diagrammatically at 240, mounted upon a bracket 242 bolted to the machine frame, and by which the amplitude of the current may be adjustably controlled by the operator. From the rheostat 240 the current is led to the primary winding 244 of a transformer, the secondary 246 of which is connected directly to the holding plates 250 in which the electrode points 120 are received. Referring to Figs. 18, 19 and 20, in which the timer is shown in detail, copper and fiber segments 260, 262, are secured to and insulated from the upper end of the cam shaft. The segments 260, 262 are provided with flanged inner ends with which insulating rings 264 cooperate to hold the segments in place, the rings being clamped between a shoulder 265 upon a bushing 266 and a lock nut 268 screwed onto the bushing, as shown main driving shaft 40 continues to rotate until the end of the plunger is brought up against the cam surface 412. Further movement of the main driving shaft therefore operates to cause the bracket 404 to swing about the pin 406 as a center, compressing the spring 402 and disengaging the clutch at a time when the electrodes are in their separated position.

The machine thus far described is adapted for performing the welding operations upon the rim portions of the steel vehicle wheel. The machine may, however, be employed to perform welding operations at varying portions of the surfaces of the wheel, and for this purpose the welding units, including the welding electrodes and their operating mechanism, may be moved radially toward the center of the wheel. For this purpose the frames supporting the welding units are mounted in ways 450 (see Fig. 16) upon which the entire units may be moved toward the center of the wheel to bring the electrode points at the desired portion of the surface of the wheel. A threaded rod 452 is screwed through the lower portion of the frame of each welding unit and the desired adjustment of the welding units may conveniently be made, by turning the rod by a wrench or other tool applied to the squared end 454 of the rod, as seen in Fig. 1.

When it is desired to perform the welding operations upon the hub section of a wheel in order to weld the ends of the spokes to the hub flanges and to weld the hub flanges themselves at a point between adjacent spokes, a single electrode unit is employed in each of positions B and C, each having only a single pair of electrode points. These electrodes are adjusted radially so as to bring the electrode points at the proper position with relation to the hub section of the wheel, and thereafter the machine is operated exactly as in the case of the operation upon the rim section to perform the desired welding operations. In Figs. 30, 31, 32 and 33 details are shown of the portions of a wheel holding jig in which the hub section and spokes are shown in their assembled position. One half of the hub section with eight radiating spokes is assembled in the wheel jigs, the spokes being received between guides 460, and held from outward movement by pins 462. The flattened inner ends of the spokes are received in pockets between the parts of the half hub section, as clearly shown in Figs. 30 and 32. The ends of the spokes are first welded to the hub sections during the eight successive advances of the wheel holding jig while in position B. As the wheel holding jig is moved to position C, the wheel is given 1/16 of a rotation with relation to the jig by means of the raising cam 100 in exactly the same manner as has been described in connection with the rim welding operations, so that in position C the welding is performed at points intermediate the ends of the spoke to weld the portions of the hub together.

In welding those vehicle wheels which are to be used as rear wheels and upon which brake drums are bolted or riveted, the formation of the holes for securing the brake drum to the flanges of the hub section of the wheel is accomplished in the manufacture of the wheel before the welding operations, so that it is necessary that the electrode points should remain in a separated position until the wheel has been rotated by the wheel holding jig beyond the bolt holes for the brake drum. In wheels such as those illustrated in the above mentioned Stanley patent, four bolt holes are provided so that when operating upon such a wheel the electrode points in position C are held separated so as to weld the hub sections at only every other space between the spokes. This is accomplished by means of a special Geneva drive shown in detail in Figs. 34, 35 and 36. Referring to Fig. 17 it will be observed that each electrode driving shaft 126 is provided with a bevel gear 470 which meshes with a bevel gear 472 upon the lower end of the cam shaft 125. The Geneva gearing illustrated in Fig. 34 is located in within the space indicated at 475 in Fig. 17 and is normally rendered inactive as will be described. The Geneva gearing comprises a pinion 478 keyed to the electrode drive shaft 126 and having one clutch member 480 secured thereto. The pinion 478 meshes with a spur gear 492 upon a counter shaft 494, upon which the Geneva gear 496 is secured. The Geneva gear meshes with a Geneva pinion 500, which is provided with an extended hub 501. The second clutch member 502 is mounted upon the extended hub 501. The Geneva pinion 500 is slidably mounted upon a sleeve 503 upon the second end of which the beveled gear 470 for actuating the cam shaft is secured. A set screw 505 secures the clutch member 502 and Geneva pinion 500 together. During the normal operation of the machine as a rim welder, the Geneva pinion 500 is disengaged from the Geneva gear by bodily movement along the sleeve 503 into a position in which the clutch members 480 and 502 are brought into engagement. With the Geneva pinion 500 disengaged from the Geneva gear and with the clutch members 480 and 502 in engagement, the rotations of the electrode driving shaft 126 are transmitted directly to the sleeve 503 and thence through the beveled gears 470 and 472 to the cam shaft 125. When the machine is operating upon the inside hub section of the rear wheels to which brake drums are to be secured, the Geneva pinion 500 is moved along the sleeve 503 into operative engagement with its Geneva gear 496, so that thereafter during the operation of the machine the Geneva gear train operates to hold the electrode points in separated relation at each alternate welding position. This is accomplished by the design of the Geneva gear 496 as shown in detail in Fig. 36 during one half of each revolution of which the cam shaft 125 is permitted to remain stationary.

While the invention has been illustrated and described as embodied in a machine for welding a steel vehicle wheel, it is to be understood that certain features of the invention may be used with advantage in welding other articles as defined in the following claims.

Having thus described the invention what is claimed is:—

1. A machine for producing a series of welded areas in different portions of a steel wheel having, in combination, wheel supporting means, welding electrodes, and means for relatively moving the wheel supporting means and welding electrodes to present successive portions of the wheel to a welding position.

2. A machine for producing a series of welded areas in different portions of a steel wheel having, in combination, means for supporting a plurality of steel wheels, welding electrodes, means for relatively moving the wheel supporting means and the welding electrodes to present successive wheels to a welding position and mechanism for revolving the wheel supporting means to form successive welds in each wheel.

3. A machine for producing a series of welded areas in different portions of a steel wheel having, in combination, a plurality of wheel supporting devices, welding electrodes, and means for relatively moving the wheel supporting devices and welding electrodes to present successive wheels and successive portions of each wheel to a welding position.

4. A welding machine having, in combination, a plurality of supporting devices for vehicle wheels, welding electrodes, means for moving the successive supporting devices into welding position, and means for relatively moving the supporting devices with relation to the welding electrodes to present successive portions of the wheel to a position to be welded.

5. A welding machine having, in combination, a plurality of supporting jigs for vehicle wheels, welding electrodes, means for relatively moving the supporting jigs to present successive jigs to the welding electrodes, and means for intermittently rotating the supporting jigs to present successive portions of the wheel to a welding position.

6. A welding machine having, in combination, a plurality of supporting jigs, a turret upon which the jigs are mounted, welding electrodes arranged about the turret, and means for automatically revolving the turret to present successive supporting jigs to the welding electrodes.

7. A welding machine having, in combination, a plurality of supporting jigs, a turret upon which the jigs are mounted, welding electrodes arranged about the turret, means for automatically revolving the turret to present successive supporting jigs to the welding electrodes, and means for intermittently rotating the individual jigs to present successive portions to a position to be operated upon by the welding electrodes.

8. A welding machine having, in combination, a plurality of supporting jigs, welding electrodes, means for revolving the supporting jigs to present successive jigs to the electrodes, and means for intermittently rotating each jig to present successive portions of the article supported thereby to a position to be operated upon by the welding electrodes, including a driven shaft, and connections between the driven shaft and jigs for intermittently rotating the jigs.

9. A welding machine having, in combination, a plurality of supporting jigs, welding electrodes, and means for automatically moving successive supporting jigs into position to be operated upon by the electrodes, and to thereafter rotate the jig while in such position to present successive portions thereof to a welding position, said means including a driven shaft, means actuated by the shaft for intermittently moving the supporting jigs through successive steps, and means actuated by the shaft for intermittently rotating the supporting jigs while in a welding position.

10. A welding machine having, in combination, welding electrodes, a plurality of supporting devices, a revolvable turret in which said devices are mounted, and means for intermittently turning the turret to move successive supporting devices into a position to be operated upon by the welding electrodes, said means including a driven cam, a ratchet actuated thereby and a Geneva gear train connecting the ratchet and the turret by which the turret is intermittently revolved.

11. A welding machine having, in combination, welding electrodes, a plurality of supporting devices, a revolvable turret in which said devices are mounted, means for intermittently turning the turret to move successive supporting devices into a position to be operated upon by the welding electrodes, said means including a driven cam, a ratchet actuated thereby and a Geneva gear train connecting the ratchet and the turret by which the turret is intermittently revolved, and means for intermittently rotating the supporting devices in timed relation to the intermittent revolutions of the turret to permit a complete rotation of the supporting devices during the interval between successive intermittent turns of the turret.

12. A welding machine having, in combination, a plurality of welding electrodes, a plurality of supporting jigs, means for moving successive jigs through successive steps to present the jigs to successive electrodes, means for intermittently rotating each jig to permit the welding operation to be performed while the jig is in a welding position, and means for relatively moving the article with relation to its supporting jig during passage of the jig from one electrode to the next to permit the second welding electrode to perform welding operations at different portions of the article.

13. A welding machine having, in combination, wheel supporting means, welding electrodes, means for relatively moving the wheel supporting means and welding electrodes to weld the wheel at a plurality of points, and means for automatically operating the welding electrodes to weld the wheel at such points.

14. A welding machine having, in combination, a plurality of supporting jigs, welding electrodes, means for moving the supporting jigs to present successive jigs to welding position and to intermittently rotate the supporting jigs while in a welding position, and means for automatically operating the welding electrodes in timed relation to the movements of the supporting jigs.

15. A welding machine having, in combination, a plurality of supporting jigs, welding electrodes, means for advancing successive supporting jigs to welding position and for intermittently rotating the supporting jigs while in such position, including a driven shaft, and connections between the driven shaft and supporting jigs, and means actuated by the driven shaft for operating the welding electrodes in timed relation to the movements of the supporting jigs.

16. A welding machine having, in combination, a plurality of supporting jigs, welding electrodes, means for advancing successive supporting jigs to a welding position and for intermittently rotating the jigs while in such position, a timing device for controlling the welding current, electrode operating mechanism, and connections between the timing device and electrode operating mechanism.

17. A welding machine having, in combination, welding electrodes, wheel supporting means, means for positioning the wheel supporting means with relation to the welding electrodes, and means operating in timed relation to the operation of said positioning means for operating the welding electrodes to successively weld the wheels at a plurality of points.

18. A welding machine having, in combination, welding electrodes, a plurality of wheel supporting jigs, means for moving successive wheel supporting jigs into a position to be operated upon by the welding electrodes and for permitting each jig to remain in such position for a definite period of time, means for rotating each wheel holding jig to present successive portions of the wheel to a welding position, and means operating in timed relation to both movements of the wheel holding jig to perform the welding operations between successive steps in the rotation of the wheel holding jig in each position.

19. A welding machine having, in combination, welding electrodes having movable electrode points, a plurality of wheel holding jigs, means for moving successive wheel holding jigs into a position to be operated upon by the welding electrodes, means for rotating the wheel holding jig while in a welding position through a plurality of steps, and means for moving the electrode points into contact with the wheel, and for thereafter separating them between each step in the rotation of the wheel holding jig.

20. A welding machine having, in combination, welding electrodes, a plurality of wheel holding jigs, means for moving successive jigs into a welding position including a driven shaft, and connections between the driven shaft and jigs, means actuated by the driven shaft for intermittently rotating the jigs while in welding position, and means actuated by the shaft for operating the welding electrodes in timed relation to the movements of the wheel holding jig.

21. A welding machine having, in combination, supporting means, welding electrodes, means for moving the supporting means to present different portions thereof to the welding electrodes, and operating mechanism for the welding electrodes including controlling cams, adjustable connections between the controlling cams and electrode points, and means for actuating the cams in timed relation to the operation of said positioning means.

22. A welding machine having, in combination, welding electrodes, means for moving a wheel into a welding position including a driven shaft, means for operating the electrodes to perform the welding operation, and a clutch for controlling the driven shaft arranged to bring the latter to rest only when the electrodes are in a separated position.

23. A welding machine having, in combination, welding electrodes, electrode operating mechanism, means for positioning an article in welding position, and for actuating the electrode operating mechanism, including a main driving shaft, a clutch for controlling the actuation of the main driving shaft, and means for controlling the operation of the clutch whereby the driving shaft is stopped only when the electrodes are in a separated position.

24. A welding machine having, in combination, welding electrodes, electrode operating mechanism, means for positioning an article in welding position, and for actuating the electrode operating mechanism, including a shaft, a clutch for controlling the actuation thereof, and means for controlling the operation of the clutch comprising a cam, a plunger cooperating therewith, and connections between the plunger and clutch arranged to cause disengagement of the clutch when a definite point of the cam is brought into engagement with the plunger.

25. In a welding machine, the combination of welding electrodes, and means for presenting successive wheels to welding position including a revoluble turret, means for intermittently revolving the turret, and a plurality of wheel supporting jigs mounted on the turret.

26. In a welding machine, the combination of welding electrodes, and means for presenting successive wheels into welding position including a revoluble turret, means for intermittently revolving the turret, a plurality of wheel supporting jigs, and means for rotating each wheel supporting jig while in welding position.

27. In a welding machine, the combination of welding electrodes, and means for presenting successive wheels to welding position including a revoluble turret, means for intermittently revolving the turret, a plurality of wheel supporting jigs mounted upon the turret, and means actuated in timed relation to the movements of the turret for rotating the jigs while in welding position to present successive portions of each wheel to the welding electrodes.

28. In a welding machine, the combination of welding electrodes, and means for presenting successive wheels to welding position including a plurality of wheel supporting means, means for intermittently moving the wheel supporting means to present successive wheels to welding position, and means for intermittently rotating each wheel supporting means while in welding position.

29. In a welding machine, the combination of welding electrodes, a plurality of wheel holding jigs, means for moving the wheel holding jigs into welding position, retaining devices upon each jig for holding the wheels in fixed relation to the jigs during movement into welding position, and means for disengaging the wheels from said retaining devices to shift the position of the wheel with relation to its jig.

30. In a welding machine, the combination of welding electrodes, means for presenting successive wheels to welding position including a plurality of wheel supporting jigs, means for intermittently rotating the jigs while in welding position to form a predetermined number of welds around the wheel, and means for relatively shifting the position of the wheels and jigs in order to thereafter weld the wheel at a plurality of intermediate points.

31. A welding machine having a wheel supporting jig comprising a supporting disk, members for retaining the rim portions of a wheel in operative position upon the disk, and clamping devices for clamping the spokes, rims and hub sections upon the disk.

32. A welding machine having a wheel supporting jig comprising a supporting disk, members on the periphery thereof for retaining the rim portions of the wheel in operative position upon the disk, clamping devices for holding the outer ends of the spokes of the wheel in operative position, a shaft extended through the disk and upon which the disk is keyed, and a clamping device upon the end of the shaft for engaging the hub section of the wheel.

33. A welding machine having a wheel supporting jig comprising a supporting disk, a shaft extended through the disk and upon which the disk is keyed, positioning members for holding the wheel with relation to the disk for permitting vertical movement of the wheel with relation to the disk when the shaft is raised, and means for clamping the wheel to the upper end of the shaft.

34. In a welding machine the combination of welding electrodes, means for positioning an article in welding position, and means for relatively moving the electrodes into contact with the surface of the article to be welded including two cams, connections between one of the cams and one electrode arranged to move the electrode to a predetermined position and hold it, connections between the second cam and second electrode arranged to yieldingly press the second electrode against the surface of the wheel to be welded.

35. In a welding machine, the combination of welding electrodes, means for positioning a wheel in welding position, and means for relatively moving the electrodes into contact with the surface of the wheel to be welded including two cams, connections between one of the cams and one electrode arranged to move the electrode to a predetermined position and hold it, connections between the second cam and second electrode arranged to yieldingly press the second electrode against the surface of the article to be welded, and means for adjustably determining the amount of yielding pressure exerted by the second electrode during the welding operation.

36. In a welding machine, the combination of welding electrodes, means for presenting a wheel to welding position, and means for moving the electrodes into contact with the portion of the wheel to be welded including a cam, connections between the cam and an electrode including a coiled spring through which movements of the cam are transmitted to the electrode to yieldingly press it against the article, and mechanism for determining the pressure exerted by the electrode during the welding operation including an indicating member and means cooperating with the spring for actuating the indicating member in accordance with the relative elongation or compression of the spring.

37. In a welding machine, the combination of welding electrodes, means for presenting an article to welding position, means for relatively moving the article and electrode through a plurality of steps while in welding position to weld different portions thereof, means for moving the electrodes into and out of contact with the wheel at each step of the wheel and electrodes while in welding position, and means for holding the electrodes out of contact with the wheel during a predetermined number of the successive steps in the relative movement of the article and electrodes while in welding position.

38. In a welding machine, the combination of welding electrodes, means for presenting an article to be welded into welding position, means for relatively moving the article and electrode through a plurality of steps while in welding position to weld different portions thereof, means for moving the electrodes into and out of contact with the wheel at each step in the movement of the article and electrodes, and means for holding the electrodes out of contact with the wheel during a predetermined number of the successive steps in the relative movement of the wheel and electrodes while in welding position, said means including Geneva gears.

39. In a welding machine, the combination of welding electrodes, mechanism for positioning an article in welding position, electrode operating mechanism for moving the electrodes, and a driving mechanism for both of said mechanisms including a clutch arranged to insure the stopping of the machine when the electrodes are in their separated position.

40. In a welding machine, the combination of welding electrodes, wheel positioning means, electrode operating mechanism, and driving mechanism for actuating the wheel positioning means, and electrode operating mechanism having provision whereby the machine is stopped automatically with the electrodes in separated position.

41. A welding machine having a driving mechanism comprising a driving shaft, a driven shaft, a clutch between the shafts, and mechanism for actuating the clutch including a throw-off lever, and means cooperating with the throw-off lever and driven shaft for stopping the machine at a predetermined point in the cycle of operations independently of the time at which said throw-off lever is operated.

42. A welding machine having a driving mechanism comprising a driving shaft, a driven shaft, a clutch cooperating with the shafts, and clutch actuating mechanism including a cam, connections between the cam and the clutch, a plunger cooperating with the cam, an operating lever for actuating the plunger, the cam being designed to engage the plunger at a predetermined point in the cycle of operations of the machine to thereby actuate the clutch to stop the machine.

ARTHUR M. STANLEY.
JAMES E. SIMS.